US012626449B2

(12) United States Patent (10) Patent No.: US 12,626,449 B2
Gruen et al. (45) Date of Patent: May 12, 2026

(54) RAY TRACING OF DISPLACED MICRO MESHES USING A BOUNDING PRISM HIERARCHY

(71) Applicant: Advanced Micro Devices, Inc., Santa Clara, CA (US)

(72) Inventors: Holger Gruen, Munich (DE); David Ronald Oldcorn, Milton Keynes (GB); David Kirk McAllister, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 39 days.

(21) Appl. No.: 18/540,462

(22) Filed: Dec. 14, 2023

(65) Prior Publication Data

US 2025/0200865 A1 Jun. 19, 2025

(51) Int. Cl.
*G06T 15/06* (2011.01)
*G06T 17/20* (2006.01)

(52) U.S. Cl.
CPC .............. *G06T 15/06* (2013.01); *G06T 17/20* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 2015/0042651 A1* | 2/2015 | Dwyer | G06T 15/06 |
| | | | 345/426 |
| 2021/0287431 A1* | 9/2021 | Woop | G06T 15/06 |
| 2023/0017659 A1* | 1/2023 | Thonat | G06T 15/06 |
| 2023/0081791 A1* | 3/2023 | Burgess | G06T 17/10 |
| | | | 345/418 |
| 2024/0303905 A1* | 9/2024 | Smith-Lacey | G06T 15/04 |
| 2025/0166280 A1* | 5/2025 | Thonat | G06T 17/20 |

* cited by examiner

*Primary Examiner* — Sultana M Zalalee
(74) *Attorney, Agent, or Firm* — Volpe Koenig

(57) ABSTRACT

Devices and methods for rendering a scene using ray tracing are provided which include prior to ray tracing any frame of the scene: generating, for each frame, a low resolution mesh from a high resolution mesh representing objects in the scene, the low resolution mesh comprising a plurality of micro-meshes each defining a geometric shape; sub-dividing the micro-meshes; and generating, for each micro-mesh, a displaced micro-mesh. For a frame of the scene, at least one displaced micro-mesh is traced using a bounding prism hierarchy on a condition that a prism is hit by the ray. The bounding prism hierarchy comprises the prism bounding the displaced micro-mesh and a plurality of sub-prisms each bounding a portion of the displaced micro-mesh. At least one other displaced micro-mesh is ray traced using the prism without the plurality of sub-prisms on a condition that the prism is not hit by the ray.

20 Claims, 12 Drawing Sheets

$$N_{offsets} = (\sqrt{4^N})(\sqrt{4^N}+1)/2$$

Displaced micro-mesh

Load min/max displacements for 4 sub-triangles

Normals at vertices of sub-triangles

Combine to build Bounding sub-prisms

Displaced micro-mesh with 4 sub-prisms

500

Interpolate normals from three corners for each new vertex

Displace new vertices along the interpolated normal to generate displaced micro-mesh Displace vertices along interpolated normals Displacement values are computed from sampling high resolution mesh Displaced micro-mesh Flat micro-mesh

RAY TRACING OF DISPLACED MICRO MESHES USING A BOUNDING PRISM HIERARCHY

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Figure 1:
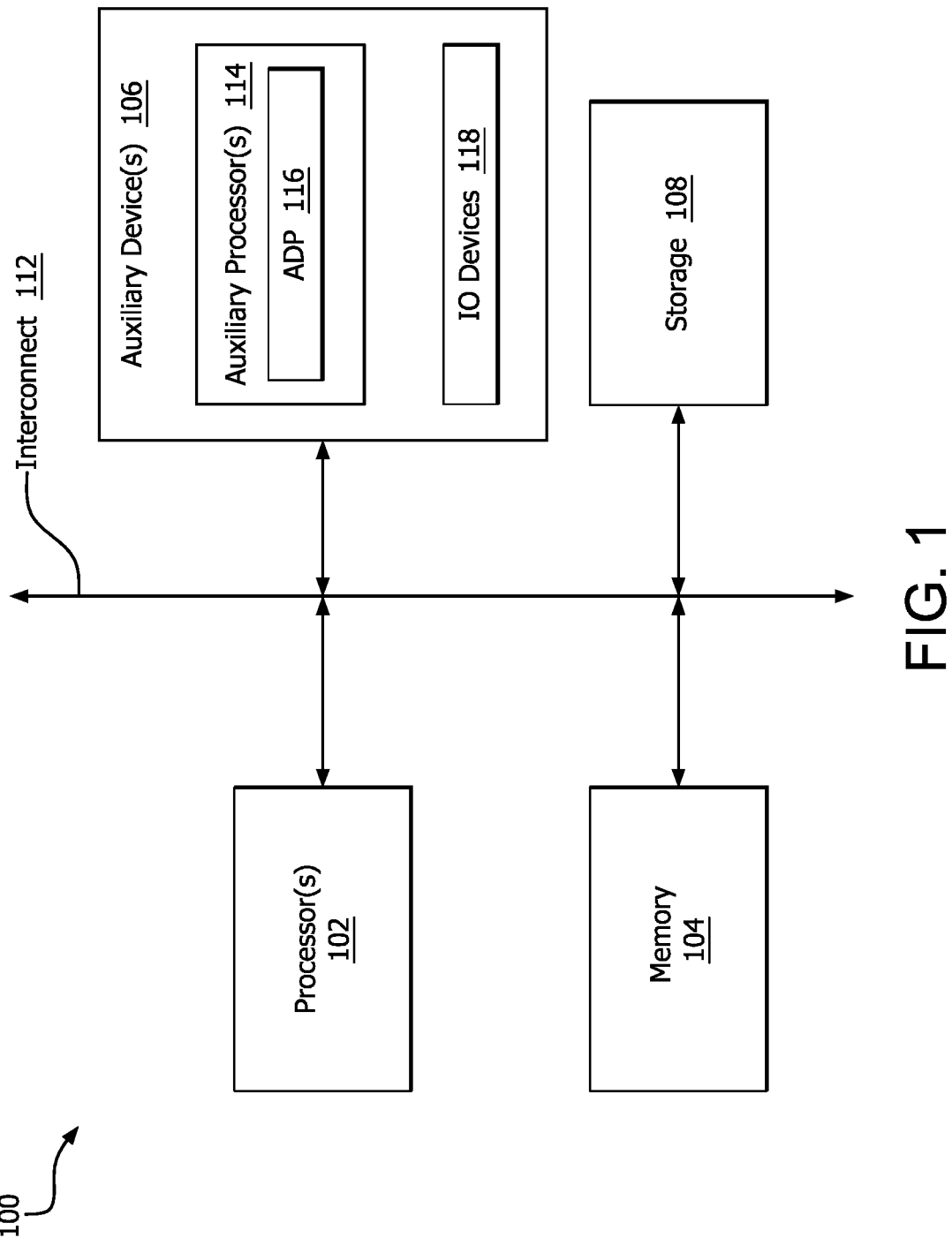
FIG. 1 is a block diagram of an example device in which one or more features of the disclosure can be implemented.

As described above, each ray intersection test is complex and expensive in terms of processing resources. Accordingly, accelerated hierarchy structures, such as a bounding volume hierarchy (BVH) are used to implement ray tracing more efficiently to make accurate determinations. While an accelerated hierarchy structure (e.g., a BVH structure) implements ray tracing more efficiently, a large amount of data is often used to represent each primitive (e.g., each node) of the BVH structure and, therefore, a large amount of memory is consumed to implement the BVH structure for ray tracing. In fact, the BVH data used to represent more complex scenes is typically too large to fit into the memory of an accelerated processor (e.g., GPU).

Displacement mapping is a graphics rendering technique which adds detail to surface geometry. Displacement mapping includes displacing (e.g., along a surface normal) the geometric positions of points over a surface according to a value generated at each point on the surface. For example, a displaced micro-mesh (e.g., a set of micro-triangles) is a type of displaced surface primitive that is generated from a low resolution version (i.e., having a smaller number of base triangles) of a high resolution mesh (i.e., having a larger number of triangles) representing objects in a scene. One or more displaced micro-triangles are generated using a displacement map in which geometric positions of points over a base triangle are displaced (e.g., along a surface normal) according to values determined at each point on the surface of the base triangle.

While displaced micro-meshes provide more depth and detail to surfaces, the additional geometry generated for the micro-meshes (e.g., micro-triangles) increases the overall cost (e.g., increased processing time and memory usage) to perform the ray tracing and render scenes. For example, more time and memory is used to generate each displaced micro-triangle and trace the rays through each of the displaced micro-triangles.

Some conventional techniques implement tessellation-free displacement mapping for ray tracing based on advanced interval arithmetic and mipmaps of square displacement textures. However, these conventional techniques are more costly (e.g., complex and require additional hardware to implement). For example, these conventional techniques rely on normalizing interpolated normals before applying displacements along the normals.

Features of the present disclosure provide apparatuses and methods for efficiently compressing surface geometry and rendering a scene (e.g., rendering objects in a scene) using ray tracing. Features of the present disclosure perform efficient ray tracing of uncompressed displaced surfaces (e.g., displaced micro-meshes) of frames using bounding prism hierarchies each comprising a top level bounding prism (which bounds the volume of the displaced micro-mesh) and bounding sub-prisms each of which bound the volume of a portion of a displaced micro-mesh. During a pre-processing stage (i.e., prior to ray tracing any frames of a scene), the micro-meshes of a low resolution mesh (i.e., low resolution version of a high resolution mesh) are subdivided, displaced micro-meshes are generated, and top level bounding prisms are generated for each displaced micro-mesh. Then, for each frame of the scene, a displaced micro-mesh is ray traced either using a bounding prism hierarchy comprising the top level bounding prism and at least one the bounding sub-prisms or using just the top level bounding prism without the plurality of sub-prisms.

Sub-prisms are dynamically generated (added) during ray intersection testing when a top level bounding prism or bounding sub-prism is determined to intersect a ray. For example, on a condition that the top level bounding prism is hit by the ray, one or more sub-prisms are generated and tested for ray intersection. Accordingly, data representing the sub-prisms which are determined to potentially intersect a ray is temporarily stored and used for ray intersection testing while data representing any sub-prisms which are determined not to potentially intersect a ray is not stored and ray intersection testing is not performed for those sub-prisms.

Features of the present disclosure provide lossy compression techniques which reduce the amount of data stored for the geometry of a scene (thereby reducing the amount of memory used to store the data) while maintaining higher compression ratios than conventional techniques. The techniques described herein compress the data such that the geometry representing larger scenes (e.g., more complex scenes) is processed on an accelerated processor (i.e., processed using the memory of an accelerated processor, such as a GPU).

Features of the present generate a low resolution version (smaller number of triangles or bi-linear quadrangles) of a high resolution mesh (larger number of triangles or bi-linear quadrangles) representing objects in a scene and then add detail to the low resolution mesh (i.e., add detail to a smaller number of triangles or bi-linear quadrangles of the low resolution mesh). For simplified explanation, features of the present disclosure are described herein using triangles as examples of micro-mesh primitives.

Features of the present disclosure efficiently ray trace displaced micro-meshes (e.g., displaced micro-triangles) without the need to normalize interpolated normals before applying the displacements (in contrast to conventional techniques).

An acceleration structure (e.g., BVH) is generated, which comprises the triangles of the low resolution mesh, to reduce the number of primitives needed for BVH construction. For simplified explanation purposes, features of the present disclosure are described herein using BVHs as examples of hierarchy accelerated data structures. Features of the present disclosure can be implemented, however, for any type of hierarchy accelerated data structure used to represent objects (e.g., volume of objects) within a scene for implementing ray tracing.

A method for rendering a scene using ray tracing is provided which comprises prior to ray tracing any of a plurality of frames of the scene: generating, for each frame of the scene, a low resolution mesh from a high resolution mesh representing objects in the scene, the low resolution mesh comprising a plurality of micro-meshes each defining a geometric shape; and generating, for each sub-divided micro-mesh, a displaced micro-mesh. The method also comprises for a frame of the scene: ray tracing at least one displaced micro-mesh using a bounding prism hierarchy comprising a prism bounding the displaced micro-mesh and a plurality of sub-prisms each bounding a portion of the displaced micro-mesh; and rendering the frame.

A computing device for rendering a scene using ray tracing is provided which comprises memory and an accelerated processor in communication with the memory. The accelerated processor is configured to prior to ray tracing any of a plurality of frames of the scene: generate, for each frame of the scene, a low resolution mesh from a high resolution mesh representing objects in the scene, the low resolution mesh comprising a plurality of micro-meshes each defining a geometric shape; and generate, for each sub-divided micro-mesh, a displaced micro-mesh. The accelerated processor is also configured to, for a frame of the scene: ray trace at least one of the displaced micro-meshes, each represented by data in the memory, using a bounding prism hierarchy comprising a prism bounding the displaced micro-mesh and a plurality of sub-prisms each bounding a portion of the displaced micro-mesh; and render the frame.

An accelerated processor for rendering a scene using ray tracing, the accelerated processor comprising: memory and fixed function hardware circuitry in communication with the memory. The fixed function hardware circuitry is configured to, prior to ray tracing any of a plurality of frames of the scene, generate, for each frame of the scene, a low resolution mesh from a high resolution mesh representing objects in the scene, the low resolution mesh comprising a plurality of micro-meshes each defining a geometric shape; and generate, for each subdivided micro-mesh, a displaced micromesh. The fixed function hardware circuitry is also configured to, for a frame of the scene: ray trace at least one of the displaced micro-meshes, each represented by data in the memory, using a bounding prism hierarchy comprising a prism bounding the displaced micro-mesh and a plurality of sub-prisms each bounding a portion of the displaced micromesh; and render the frame.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106 and storage 108. An interconnect 112, which can be a bus, a combination of buses, and/or any other communication component, communicatively links the processor(s) 102, the memory 104, the auxiliary device(s) 106 and the storage 108.

In various alternatives, the processor(s) 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the processor(s) 102, such as on the same chip or in an interposer arrangement, and/or at least part of the memory 104 is located separately from the processor(s) 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The auxiliary device(s) 106 include, without limitation, one or more auxiliary processors 114, and/or one or more input/output ("IO") devices. The auxiliary processor(s) 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116. In addition, although processor(s) 102 and APD 116 are shown separately in FIG. 1, in some examples, processor(s) 102 and APD 116 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
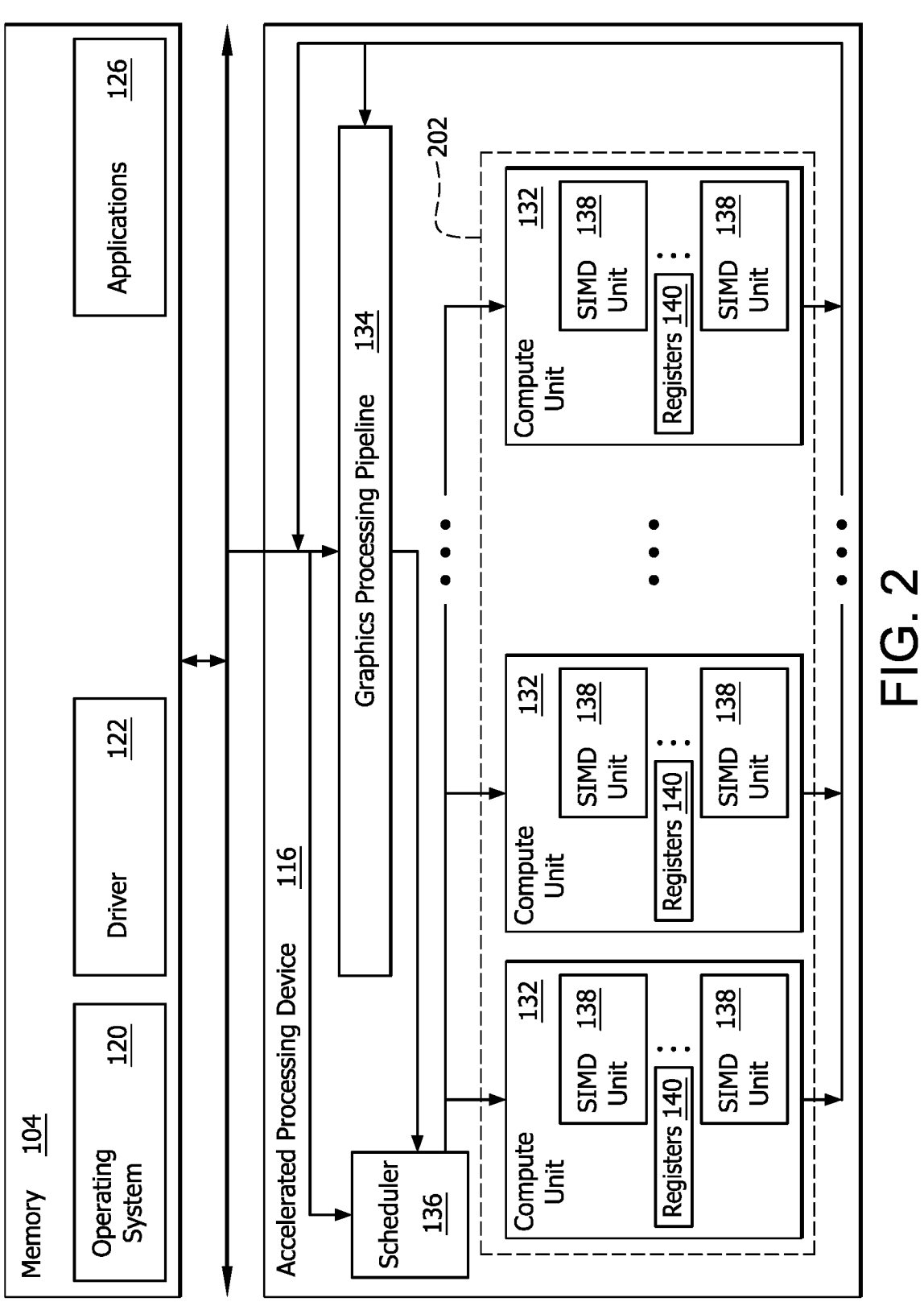
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as ISP operations and graphics operations that may be suited for parallel processing. The APD 116 can be used for executing image sensor pipeline operations such as pixel operations (e.g., channel resampling and interpolation), geometric computations, and rendering an image to display device 118 based on commands received from the processor 102. The APD 116 also executes compute processing operations that are not directly related to ISP and graphics operations, such as operations related to physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 202 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 202 and SIMD units 138.

The parallelism afforded by the compute units 202 is suitable for ISP and graphics related operations such as pixel value calculations, pixel value interpolation, vertex transformations, and other ISP and graphics operations. Thus in some instances, an image sensor pipeline 134, which accepts image sensor processing commands from the processor 102, provides computation tasks to the compute units 202 for execution in parallel.

The compute units 202 are also used to perform computation tasks not related to graphics or not performed as part of the "normal" operation of an image sensor pipeline 134 (e.g., custom operations performed to supplement processing performed for operation of the image sensor pipeline 134). An application 126 or other software executing on the processor 102 transmits programs that define such computation tasks to the APD 116 for execution.

The compute units 202 are also used to efficiently compressing surface geometry and render scenes according to features of the disclosure. Much of the work involved in ray tracing is performed by programmable shader programs, executed on the SIMD units 138 in the compute units 202, as described in additional detail below.

Figure 3:
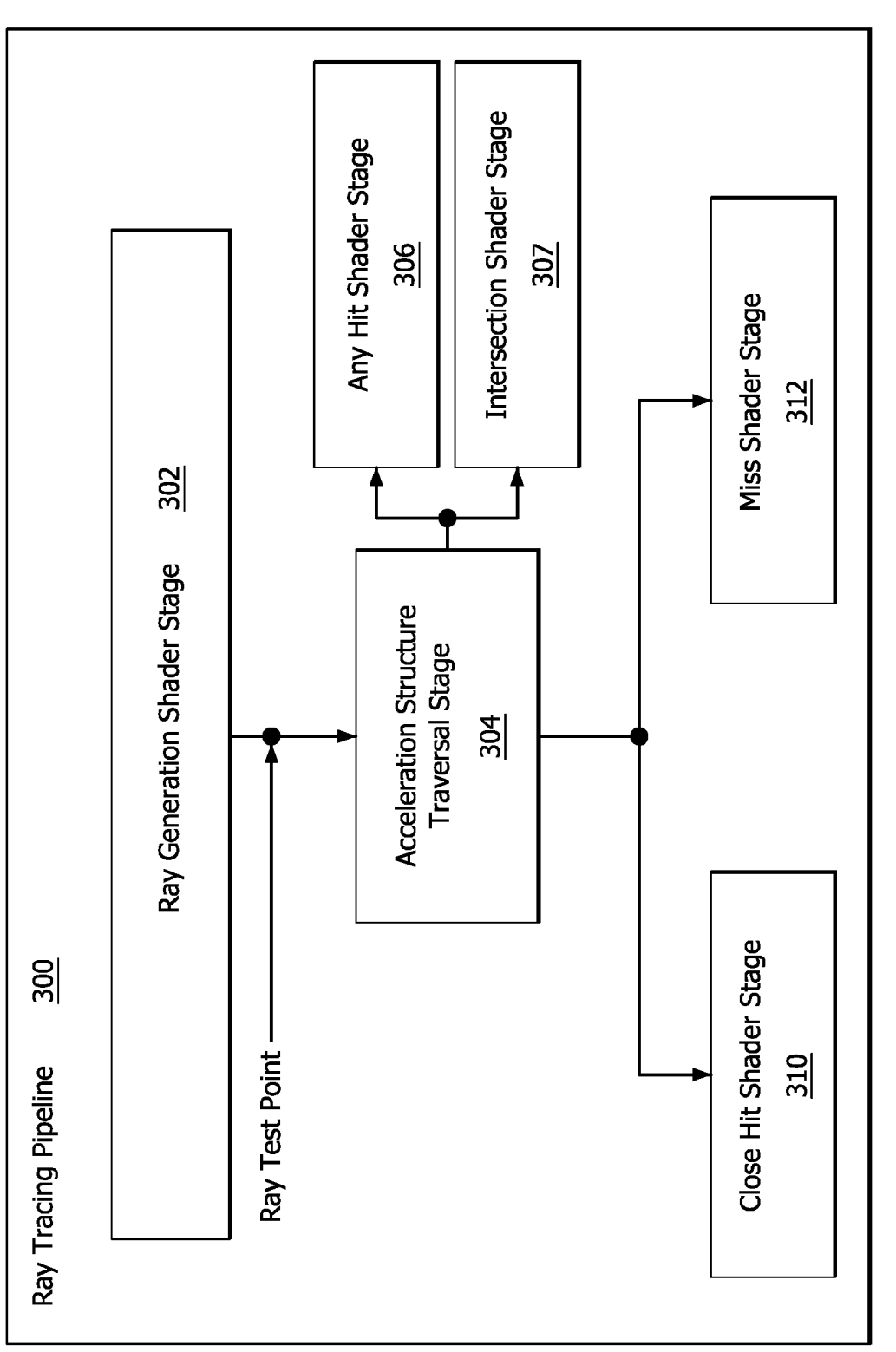
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing on the SIMD unit 138. Any of the specific shader programs at each particular shader-implemented stage are defined by application-provided code (i.e., by code provided by an application developer that may be pre-compiled by an application compiler and/or compiled by the driver 122). It should be noted that in variations, these stages can be implemented using specialized, fixed function or programmable circuitry. The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage may be implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a BVH traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a task]" is used, this means that the hardware and/or software that implements the ray tracing pipeline 300 does that task.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera (i.e., the eye of the viewer). The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This BVH is the "acceleration structure" referred to elsewhere herein. In a BVH, each non-leaf node represents an AABB that bounds the geometry of all children of that node. In an example, the base node represents the maximal extents of an entire region for which the ray intersection test is being performed. In this example, the base node has two children that each represent mutually exclusive AABBs that subdivide the entire region. Each of those two children has two child nodes that represent AABBs that subdivide the space of their parents, and so on. Leaf nodes represent a triangle or other geometry against which a ray intersection test can be performed.

The BVH data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against AABBs, followed by tests against triangles.

Figure 4:
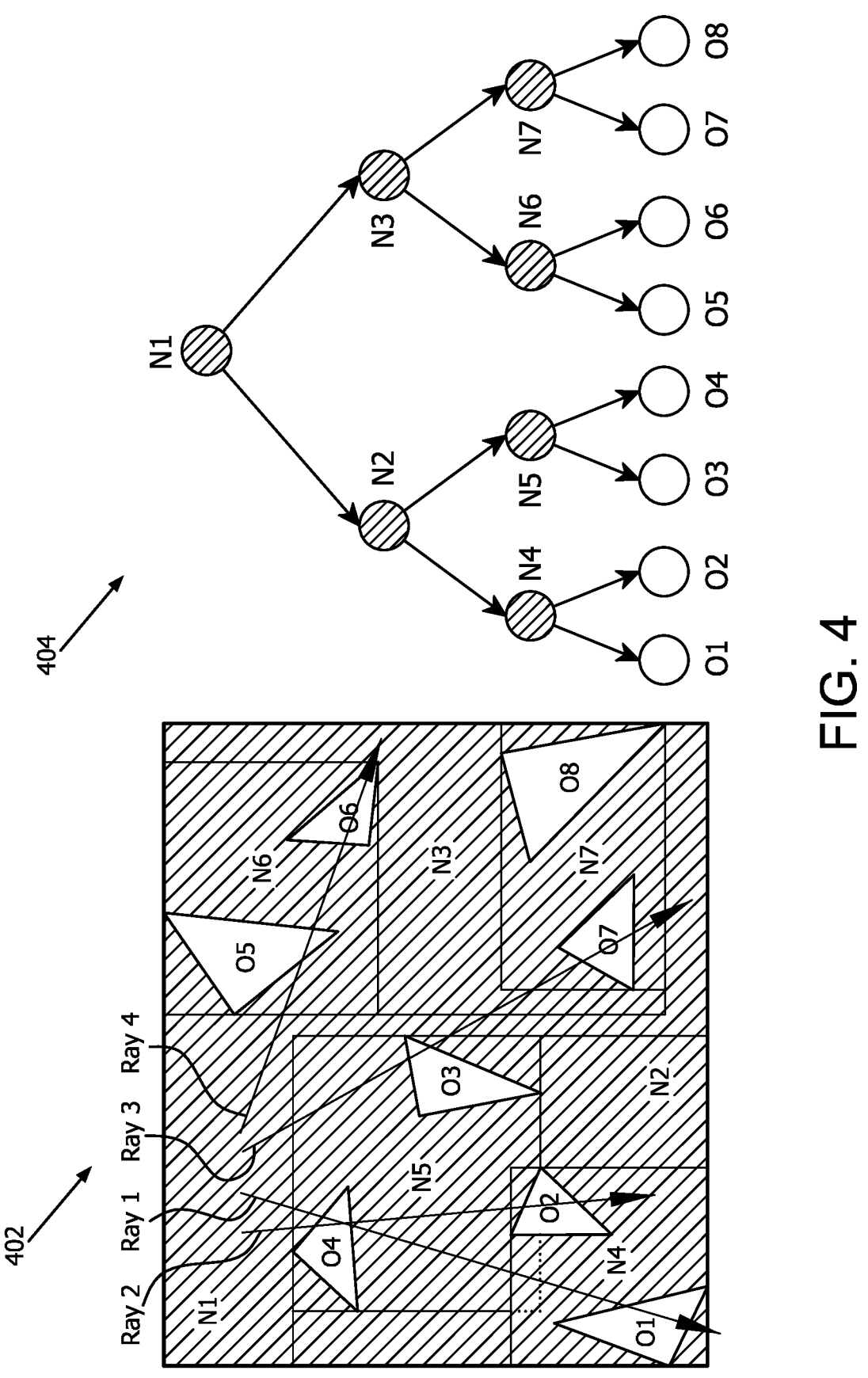
FIG. 4 is an illustration of a bounding volume hierarchy, according to an example.

FIG. 4 is an illustration of a BVH, according to an example. For simplicity, the hierarchy is shown in 2 dimensions. However, extension to 3 dimensions is simple, and it should be understood that the tests described herein would generally be performed in 3 dimensions.

The spatial representation 402 of the BVH is illustrated in the left side of FIG. 4 and the tree representation 404 of the BVH is illustrated in the right side of FIG. 4. The non-leaf nodes are represented with the letter "N" and the leaf nodes are represented with the letter "O" in both the spatial representation 402 and the tree representation 404.

For simplified explanation purposes, triangles are shown as the primitives in the example shown in FIG. 4. As described in more detail below, however, primitives can include capsules and capsule chains for rendering curves in a scene and nodes of a BVH tree can include the capsules.

A conventional ray intersection test for tree representation 404 would be performed by traversing through the tree 404, and, for each non-leaf node tested, eliminating branches below that node if the test for that non-leaf node fails. However, when a ray intersects an AABB (i.e., if the test for a non-leaf node succeeds), conventional ray traversal algorithms will continue traversal within the AABB until the test reaches a leaf node. For example, if the ray intersects $O_5$ but no other triangle, the conventional ray intersection test would test against $N_1$, determining that a ray intersects an AABB (i.e., the test succeeds for $N_1$). The test would test against $N_2$, determining that the test fails (since $O_5$ is not within $N_2$) and the test would eliminate all sub-nodes of $N_2$. Because the test against $N_1$ resulted in a determination that the ray intersected an AABB, traversal would continue to the child nodes of $N_1$, and would test against $N_3$, determining that a ray intersects an AABB (i.e., the test succeeds). Because the test against $N_3$ resulted in a determination that the ray intersected an AABB, traversal would again continue to the child nodes of $N_3$, and would test $N_6$ and $N_7$, determining that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded (e.g., how to calculate levels of brightness and color of pixels representing objects) during the rendering of a 3D scene. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, a ray tracing pipeline 300 typically traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of typical ray tracing pipeline 300 is now discussed with respect to the example rays 1-4 illustrated in FIG. 4. For each of the example rays 1-4, the ray tracing pipeline 300 determines which triangles (or other primitives, such as capsules as described in more detail below) those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for O4 unless that triangle had an any hit shader or intersection shader that, when executed, indicated that ray 1 did not hit that triangle. In that situation, the ray tracing pipeline 300 would run the closest hit shader for O1 unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with O2 and O4, executes an any hit and/or an intersection shader for those triangles if specified by the material, and runs the appropriate closest hit or miss shader. For rays 3 and 4, the ray tracing pipeline 300 determines intersections as shown (ray 3 intersects O3 and O7 and ray 4 intersects O5 and O6), executes appropriate any hit and an/or intersection shaders, and executes appropriate closest hit or miss shaders based on the results of the any hit and/or intersection shaders.

Figure 5:
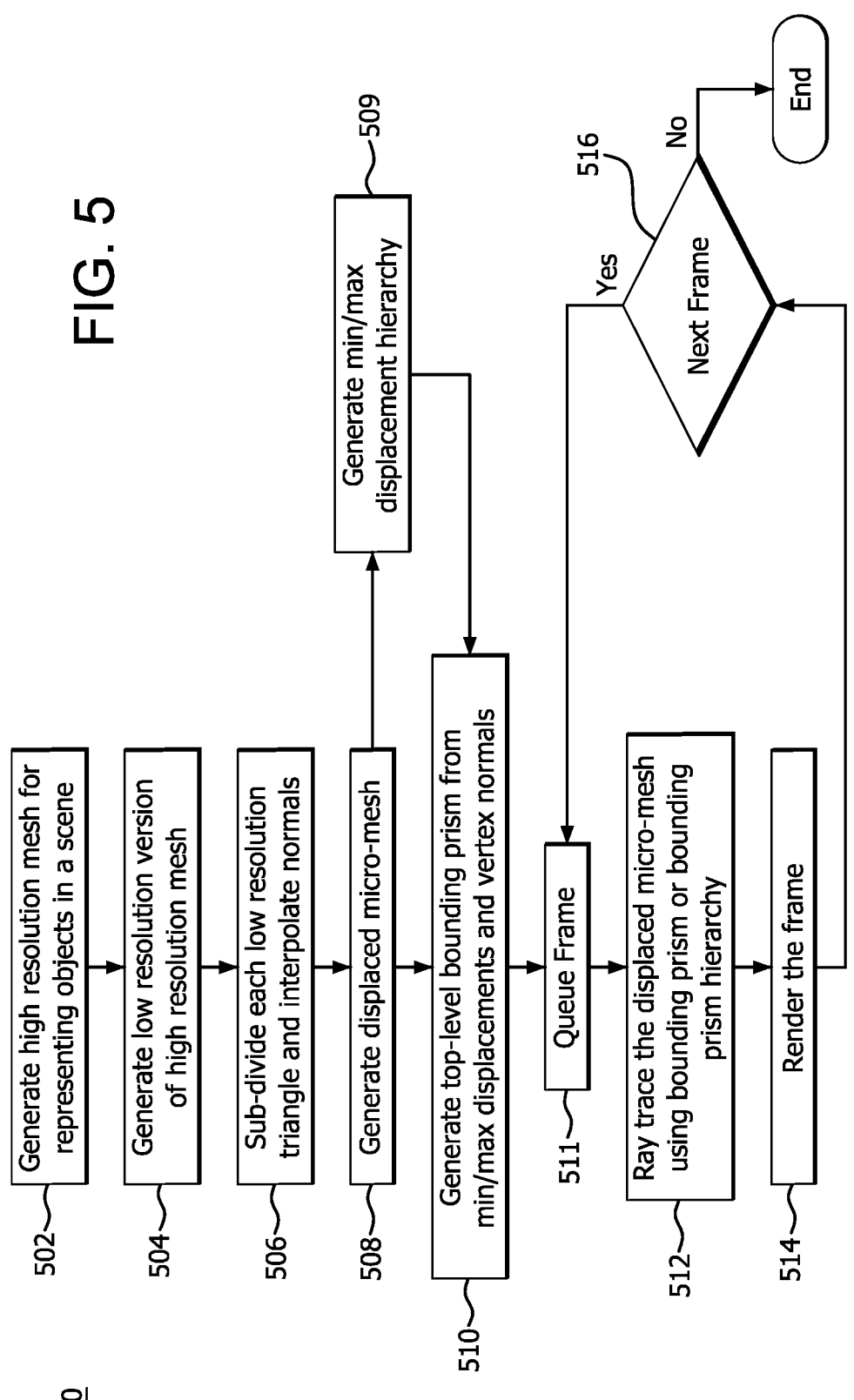
FIG. 5 is a flow diagram illustrating an example method of rendering objects in a scene using ray tracing according to features of the present disclosure.

FIG. 5 is a flow diagram illustrating an example method 500 of rendering a scene using ray tracing according to features of the present disclosure. The functions described at each of the blocks of method 500 can be performed using an accelerated processor (e.g., APD 116), using fixed function hardware circuitry configured to perform a specific function (e.g., the function at block 506 described below can be performed using fixed function hardware circuitry configured to compute points on curved surfaces) or by a combination of APD 116 and fixed function hardware circuitry.

The method 500 is now described using an example illustrated in FIGS. 6-12. For simplified explanation purposes, the example illustrated in FIGS. 6-11 (and described below) includes 2 subdivisions (i.e., N=2). However, features of the present disclosure can be implemented using a single subdivision (i.e., N=1) or more than two subdivisions (N>2).

The steps shown at blocks 502-510 are pre-processing steps performed prior to ray tracing and rendering frames of a scene (i.e., prior to ray tracing and rendering any of the frames of the scene). That is, prior to ray tracing any frame of the scene, each frame (e.g., each frame of video for an application, such as an application 126 in FIG. 2) is pre-processed according to the steps at blocks 502-510. The data produced by the pre-processing at blocks 502-510 are stored in memory at start-up of the application. The steps shown at blocks 511, 512, 514 and 516 are then performed for each frame to be ray traced and rendered (e.g., for each frame queued at block 511) using the stored data resulting from the pre-processing steps 502-510.

As shown at block 502, the method 500 includes generating a high resolution mesh comprising a plurality of triangles representing objects in the scene. The high resolution mesh includes a plurality of triangles or bi-linear quadrangles which represent surfaces of objects in a scene.

The high resolution mesh is generated, for example, using a digital content creation (DCC) program. Alternatively, the high resolution mesh is generated by scanning real-world objects. For example, a portion of a high resolution mesh 608 which comprises a plurality of triangles 612, representing the surface of an object (e.g., a ball) in a scene, is shown in inset 610 of FIG. 6.

A low resolution mesh is then generated from the high resolution mesh. That is, as shown at block 504, a low resolution version (i.e., the low resolution mesh) of the high resolution mesh is generated. The low resolution mesh includes a smaller number of triangles than the high resolution mesh. For example, operations to collapse edges of triangles of the high resolution mesh are used to reduce the number of triangles of the high resolution mesh to represent the high resolution mesh as a low resolution mesh having a smaller number of triangles than the high resolution mesh such that the low resolution mesh is a less detailed version of the high resolution mesh. For example, the low resolution mesh is generated as a less detailed version of the object than the high resolution mesh 608 shown in inset 610. Because the low resolution mesh includes a smaller number of triangles than the high resolution mesh, less connectivity data (e.g., vertex data of the triangles) is used (e.g., stored in memory) to represent the triangles of the BVH structure.

Figure 6:
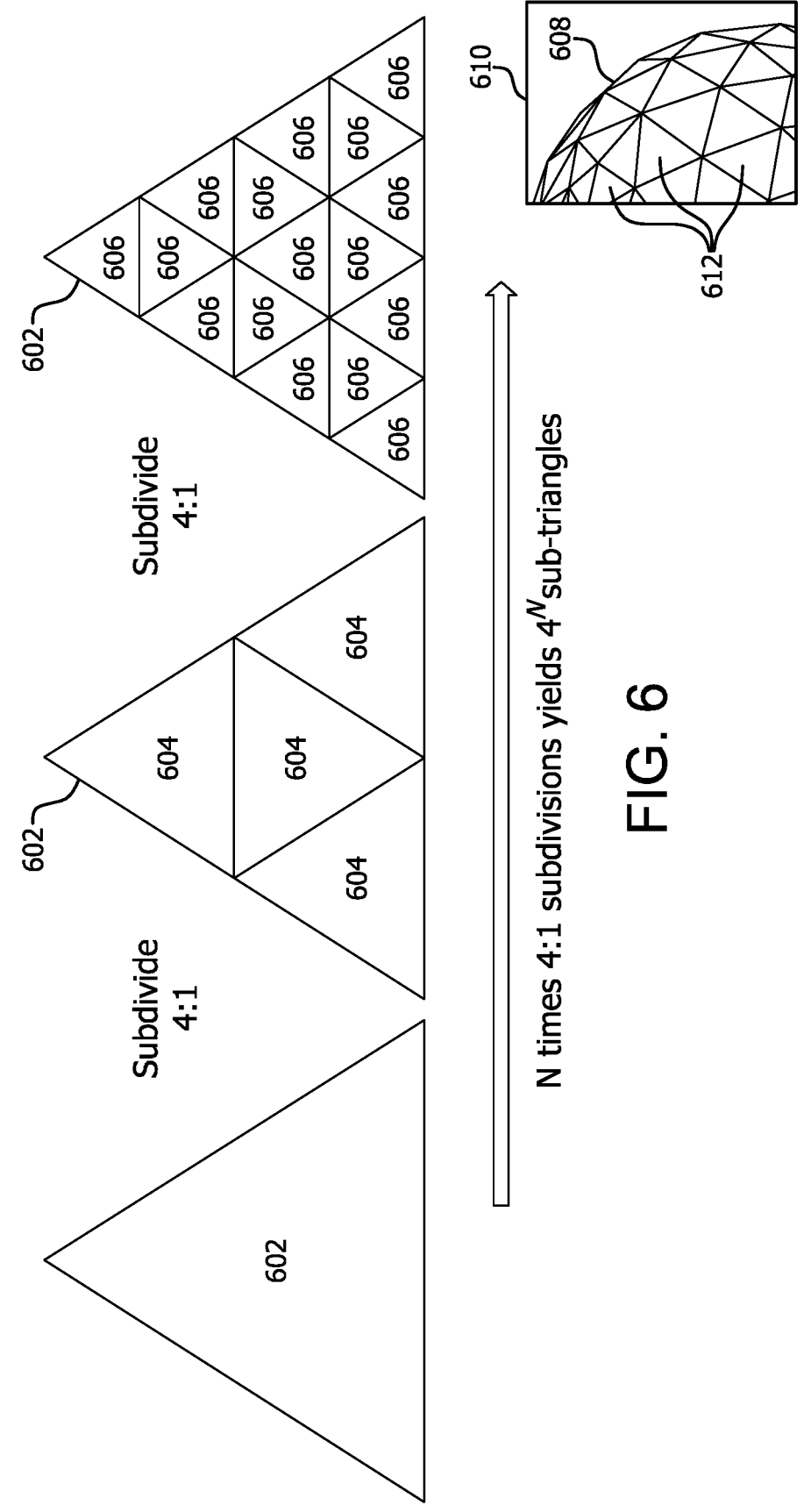
FIG. 6 is an illustration showing an example of sub-dividing a triangle of a low resolution mesh to create micro-triangles according to features of the present disclosure.

As shown at block 506, the method 500 includes sub-dividing the micro-meshes into sub-divided geometric shapes and sub-dividing the sub-divided geometric shapes into micro-geometric shapes. For example, each micro-mesh (e.g., triangle) of the low resolution mesh is subdivided into sub-divided triangles and micro-triangles and the normals of the sub-divided triangles and micro-triangles are interpolated. FIG. 6 illustrates an example of sub-dividing a triangle 602 of a low resolution mesh (e.g., the low resolution version of the high resolution mesh 608) to create subdivided triangles 604 and micro-triangles 606 according to features of the present disclosure. As shown in FIG. 6, triangle 602 is first sub-divided (i.e., 4:1 subdivision) into a set of 4 sub-triangles 604 and each of the sub-triangles 604 are further sub-divided (i.e., 4:1 subdivision) into another set of smaller sub-triangles 606 (i.e., micro-triangles). In this example, 2 (i.e., N=2) 4:1 subdivisions are performed. Accordingly, in this example, the 2 subdivisions yields 16 micro-triangles 606 (i.e., $4^{N=2}$ sub-triangles=16 sub-triangles). The sizes and number of sub-triangles and micro-triangles shown in FIG. 7 are merely an example.

Figure 7:
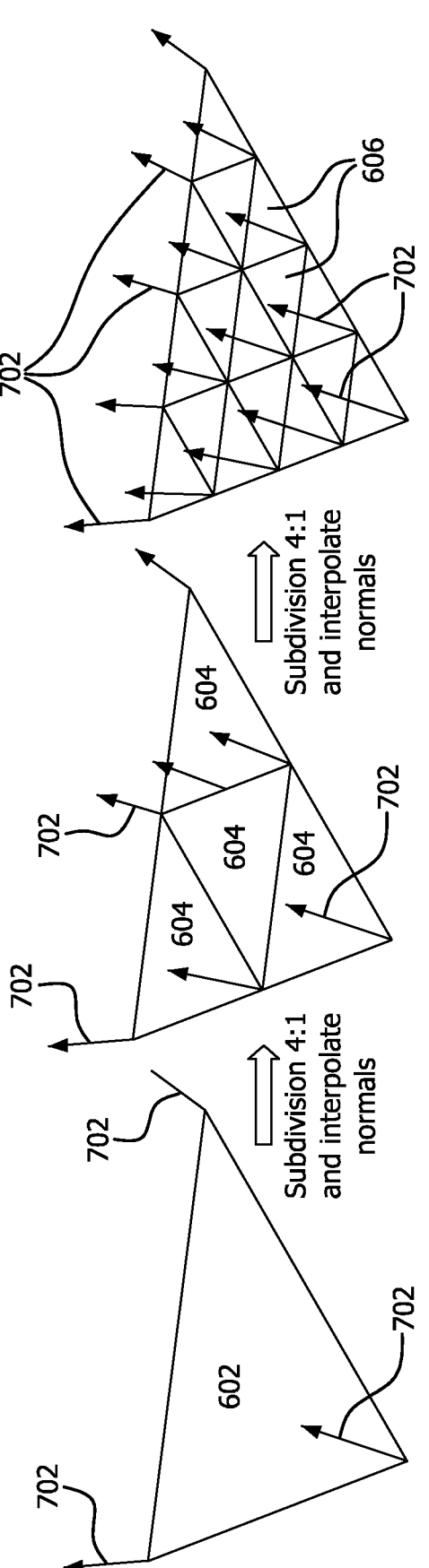
FIG. 7 is an illustration showing an example of interpolated normals of the triangle and sub-divided micro-triangles shown in FIG. 6.

FIG. 7 is an illustration showing an example of interpolating normals of the triangle 602, the sub-divided sub-triangles 604 and the micro-triangles 606. As shown in FIG. 7, the normals 702 are interpolated from the three corners for each new vertex of triangle 602, the sub-triangles 604 and the micro-triangles 606. The displacement values (offset values) of the interpolated normals are determined from sampling a high resolution mesh (e.g., high resolution mesh 608 shown in inset 610). For example, the high resolution mesh is sampled by tracing rays from positions on the sub-divided triangles of the low resolution mesh along the interpolated normals and the distance to the first hit of the ray on the high resolution mesh can be stored.

In another example, the normals can be interpolated using a triangular surface patch technique. For example, a triangular curved surface patch can be generated for the micro-triangle 602, the sub-triangles 604 and the micro-triangles 606. The surface of a triangular curved surface patch depends on the positions of a corresponding triangle of the low resolution mesh and its normals (e.g., quantized normals). The curved surface of the triangular curved surface patch extends between vertices of an edge of each triangle. The curved surfaces can be generated using various high order surface techniques (e.g., techniques which are implemented using Bezier surfaces constructed from Bezier curves), For example, the curved surfaces, can be generated using various curved surface patches with control points that can be derived solely from the vertices and normals at the vertices of a triangle.

Then, an interpolated normal is generated for each of a plurality of points (e.g., locations in a space) on the curved surface of the triangular curved surface patch. The interpolated normals are, for example, quantized normals which are determined by a combination of the three normals of one of the facets of a corresponding triangle of the low resolution mesh. Interpolated normals are determined at points on the curved surface of the triangular curved surface patch by interpolating normals of the low resolution mesh. Each interpolated normal defines a direction at a corresponding point on the curved surface for a corresponding triangle. For example, an interpolated normal of a point on the curved surface between vertices is determined by (1) calculating a vertex normal at each of the three vertices of a corresponding triangle (e.g., the vertex normal are generated by calculating an average of the surface normals of the adjacent facets which share a corresponding vertex) of the low resolution mesh; (2) interpolating (e.g., linear, quadratic, or cubic normal interpolation) the three vertex normals by weighting each vertex normal by its corresponding barycentric coordinate; and (3) summing the interpolated vertex normals.

Figure 8:
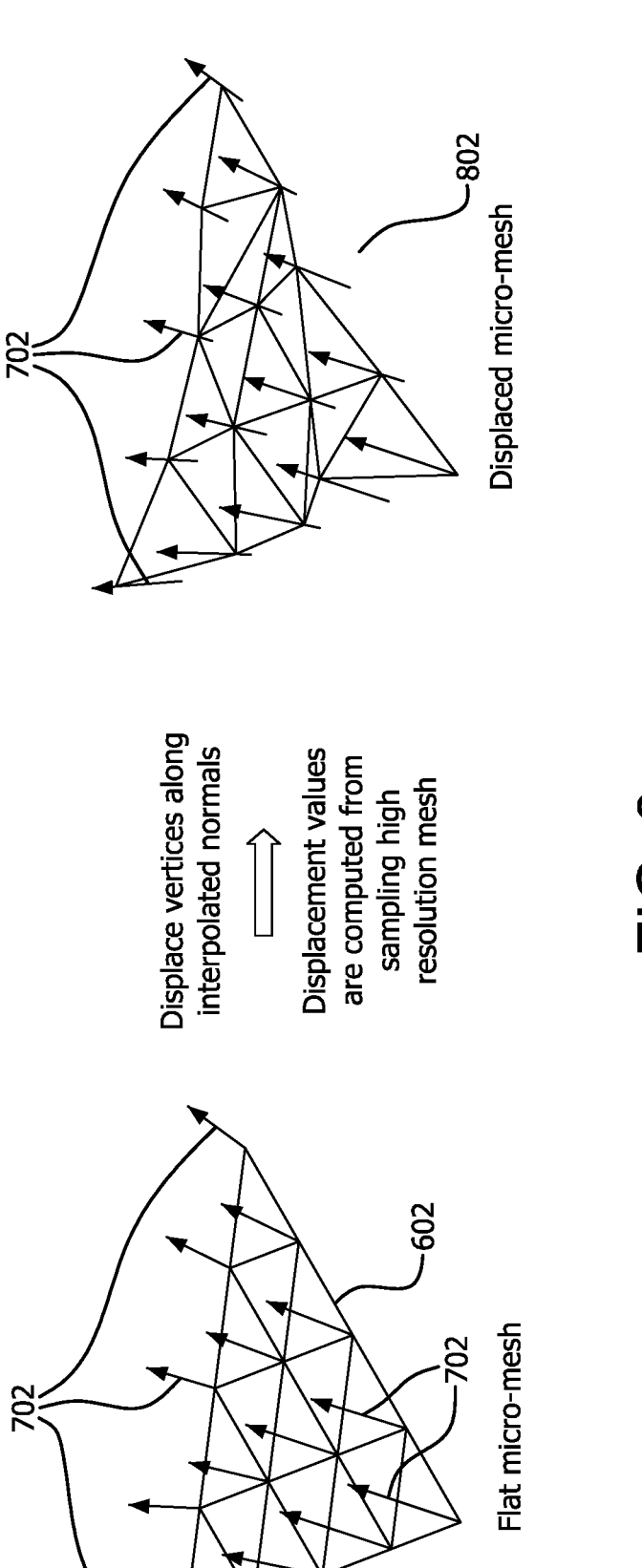
FIG. 8 is an illustration showing an example of generating a displaced micro-mesh according to features of the present disclosure.

As shown at block 508, the method 500 includes generating, from the micro-mesh (i.e., flat micro-mesh), a displaced micro-mesh and its sub-divided geometric shapes. For example, as shown in FIG. 8, a displaced micro-mesh 802 is generated from the flat micro mesh 602 (i.e., corresponding to flat triangle 602). The vertices of the displaced micro-mesh 802 are displaced, according to their determined displacement values, along the interpolated normals 702 to generate the displaced micro-mesh 802.

If a triangular surface patch is used, the displaced micro-mesh is generated by first determining an offset (i.e., displacement) of each of the interpolated normals. That is, for each point on the curved surface, a 1D offset (e.g., a distance) value is determined between a corresponding point on the triangular curved surface patch and a surface point of a triangle of the displaced micro-mesh. The offset for each point is determined by casting a ray from the point on the triangular curved surface patch along a corresponding interpolated normal.

Figure 9:
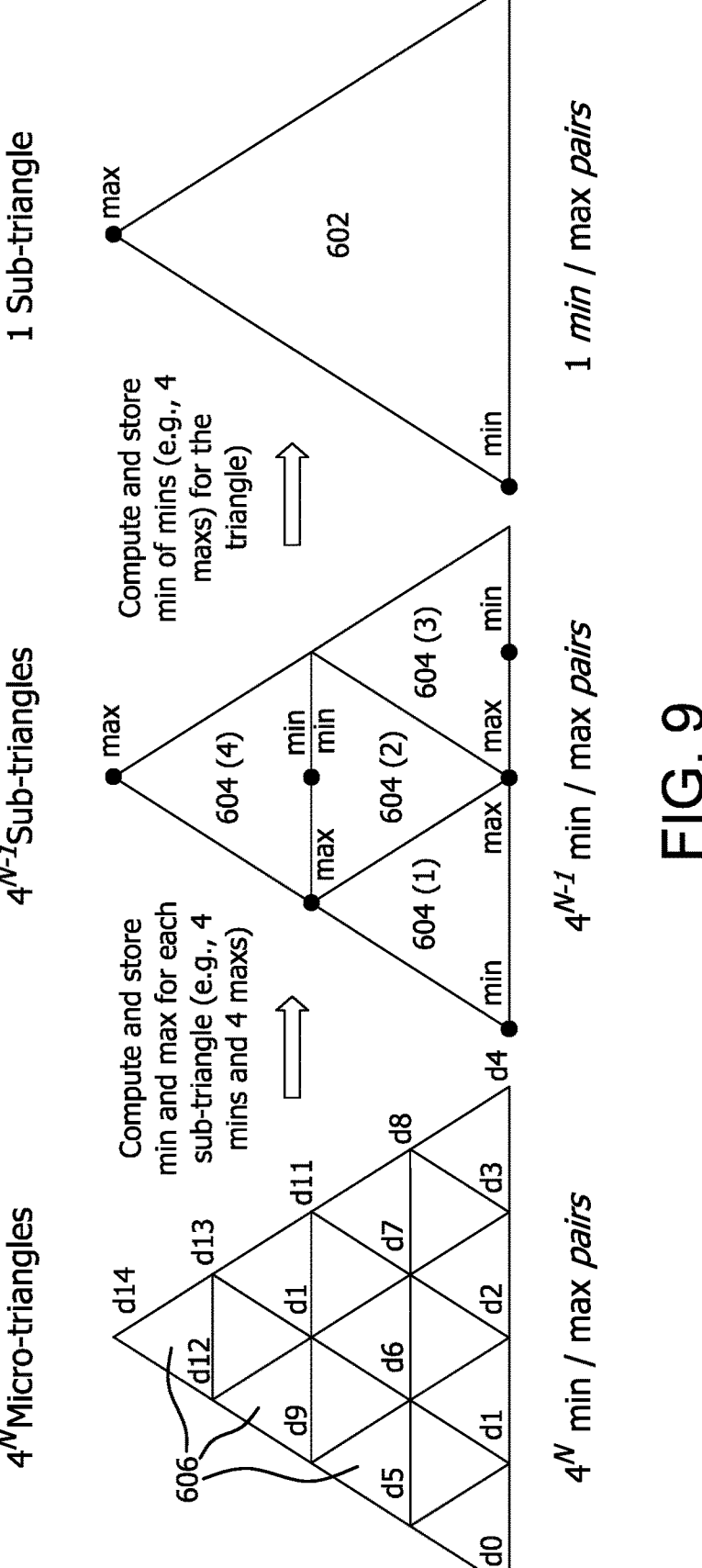
FIG. 9 is an illustration showing an example of generating a first level bounding prism of a bounding prism hierarchy according to features of the present disclosure.

As shown at block 509, the method 500 includes generating a hierarchy of minimum and maximum displacement values. For example, as shown in FIG. 9, 15 minimum and maximum displacement values (d0-d14) are temporarily stored (e.g., in cache memory). A minimum and maximum displacement values is computed for each sub-triangle 604 (1), 604(2), 604(3) and 604(4) and temporarily stored. Then, a minimum and maximum displacement value is computed, from the 4 minimum and maximum displacement values of each sub-triangle 604(1)-604(4) and is temporarily stored (e.g., in cache memory).

Figure 10:
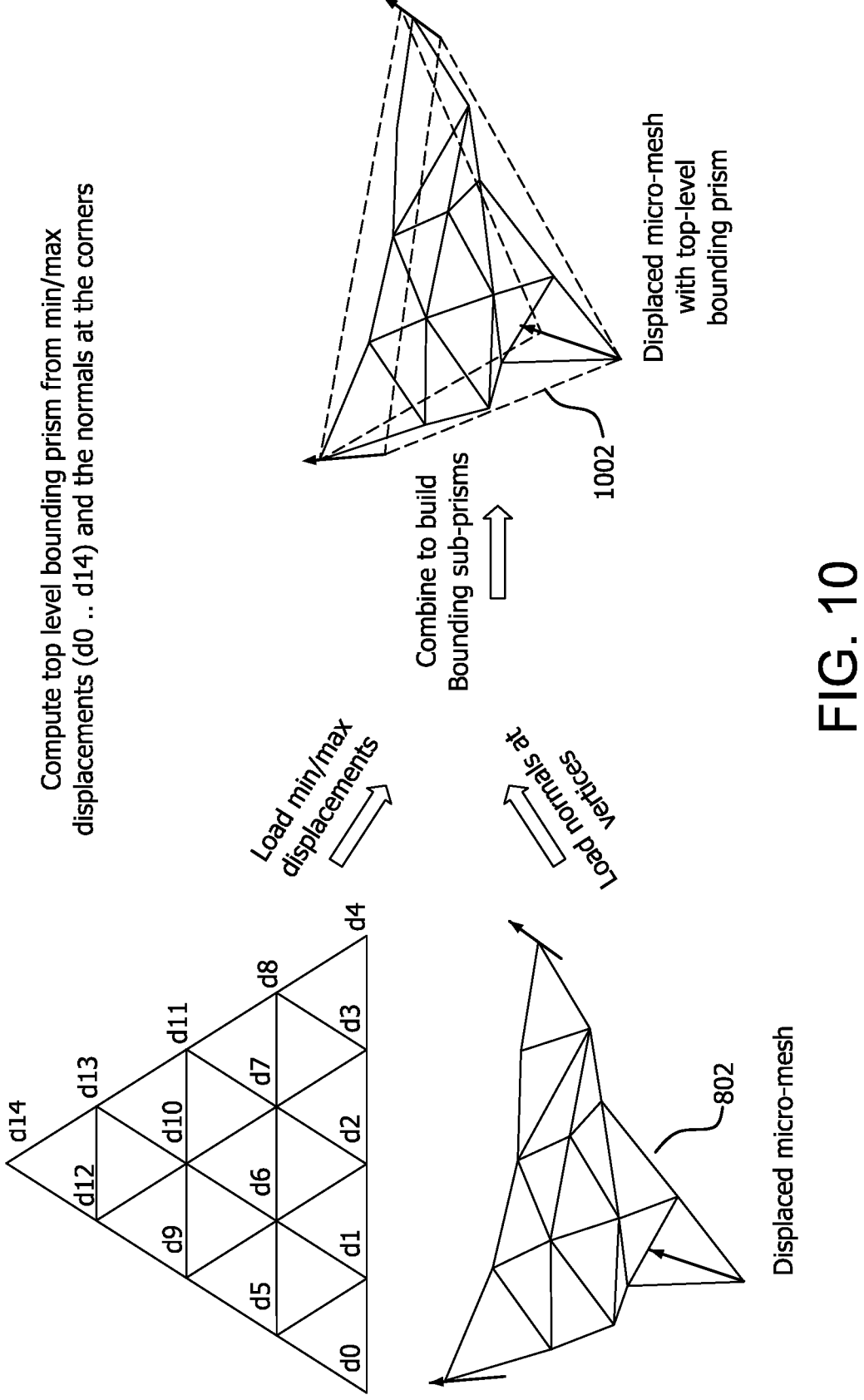
FIG. 10 is an illustration of determining a hierarchy of minimum and maximum displacements according to features of the present disclosure.

As shown at block 510, the method 500 includes generate a top-level bounding prism from minimum and maximum displacement values (d0-d14) and the 3 vertex normals of the displaced micro-mesh 802. For example, as shown in FIG. 10, the minimum and maximum displacement values (d0-d14) and the 3 vertex normals of the displaced micro-mesh 802 are loaded to registers (e.g., registers 140 of a compute unit 132 in FIG. 2) and top-level bounding prism 1002 (bounding the displaced micro-mesh 802) is generated. If the displaced micro-mesh 802 is displaced from a curved surface patch (instead of displacing the displaced micro-mesh from flat sub-divided micro-triangles), then the maximum and minimum displacements from the patch are also accounted for such that the top-level bounding prism bounds (e.g., encloses) the surface patch and the displacements.

Then, as shown at blocks 511-516, each frame (e.g., each frame of video for an application) is ray traced (i.e., each micro-mesh is ray intersection tested) and rendered. As shown in block 511, a frame is queued. A micro-mesh of the frame is then ray traced, at block 512, using either a bounding prism bounding the displaced micro-mesh or a bounding prism hierarchy comprising the bounding prism and a plurality of sub-prisms each bounding a portion of the displaced micro-mesh. As described in more detail below with regard to FIG. 12, a displaced micro-mesh is ray traced (e.g., tested for ray intersection) using the bounding prism hierarchy on a condition that the bounding prism is hit by the ray. Alternatively, a displaced micro-mesh is ray traced using the bounding prism without generating any sub-prisms of the bounding prism (i.e., without using a bounding prism hierarchy).

Figure 11:
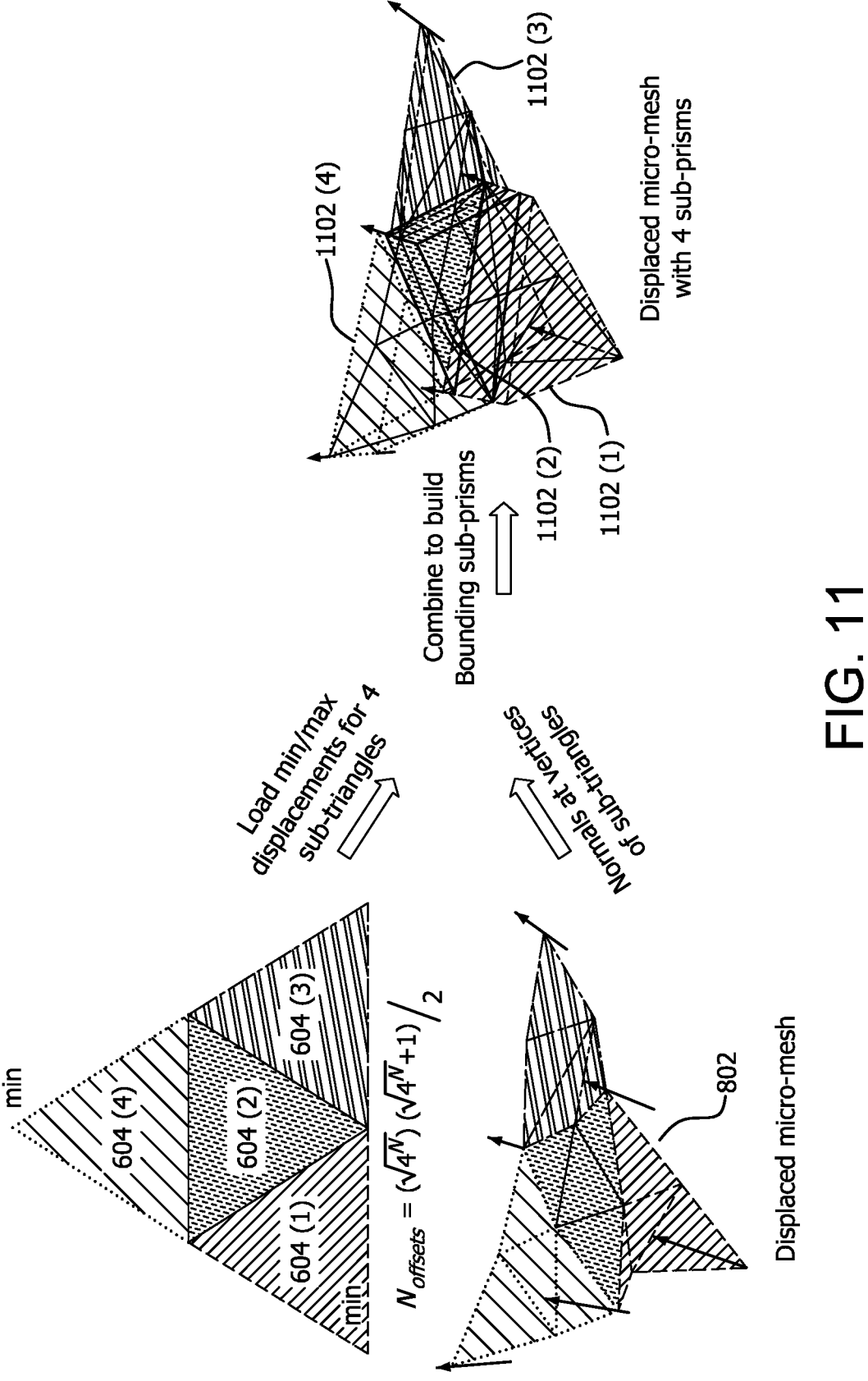
FIG. 11 is an illustration showing an example of generating sub-prisms of a displaced micro-mesh according to features of the present disclosure.

For example, on a condition that a bounding prism 1002 is hit by a ray, then 4 sub-prisms 1102(1)-1102(4) (each bounding a portion of the micro-mesh corresponding to one of the 4 sub-triangles 604(1)-604(3) are generated, as shown in FIG. 11, from minimum and maximum displacement values of the of the 4 sub-triangles 604(1)-604(3) and the normals at the vertices computed during the pre-processing stage. That is, the minimum and maximum displacement values of the of the 4 sub-triangles 604(1)-604(3) and the normals at the vertices are loaded to the registers 140 of the compute unit 132 of APD 116, which generates the 4 sub-prisms 1102(1)-1102(4). If e.g. a curved surface patch is used to displace from (instead of displacing from flat sub-divided micro-triangles) then the maximum and minimum displacements of the patch need to also be accounted for when computing the sub prisms.

The bounding prism hierarchy comprises multiple hierarchy levels. For example, as described below, the bounding prism hierarchy comprises a first level prism which bounds the volume of each of the displaced sub-triangles and a plurality of second level prisms each of which bound the volume of the smaller displaced triangles contained therein.

Ray traversal proceeds as described above using, for example, a ray tracing acceleration structure (e.g., BVH). For example, during ray intersection testing, a ray is cast toward the displaced micro-mesh 802 and after the prism hierarchy has been successfully traversed to its lowest level, a determination is made as to whether the displaced micro-mesh 802 is "hit" by the cast ray.

The determination is made as follows. The first level bounding prism 1002 is generated which bounds the volume of each of the smaller displaced micro-triangles of the displaced sub-triangle and a ray is tested against the first level bounding prism 1002. Each of the 4 sub-prisms 1102 (1)-1102(4) is a bounding volume of the smaller displaced triangles within a corresponding sub-prism. The smaller triangles can be subdivided again (and the process can continue until a determined number of subdivision levels are reached) creating a bounding volume hierarchy of triangular prisms (i.e., bounding prism hierarchy). Each side of a prism is potentially a bilinear patch and not flat.

Figure 12:
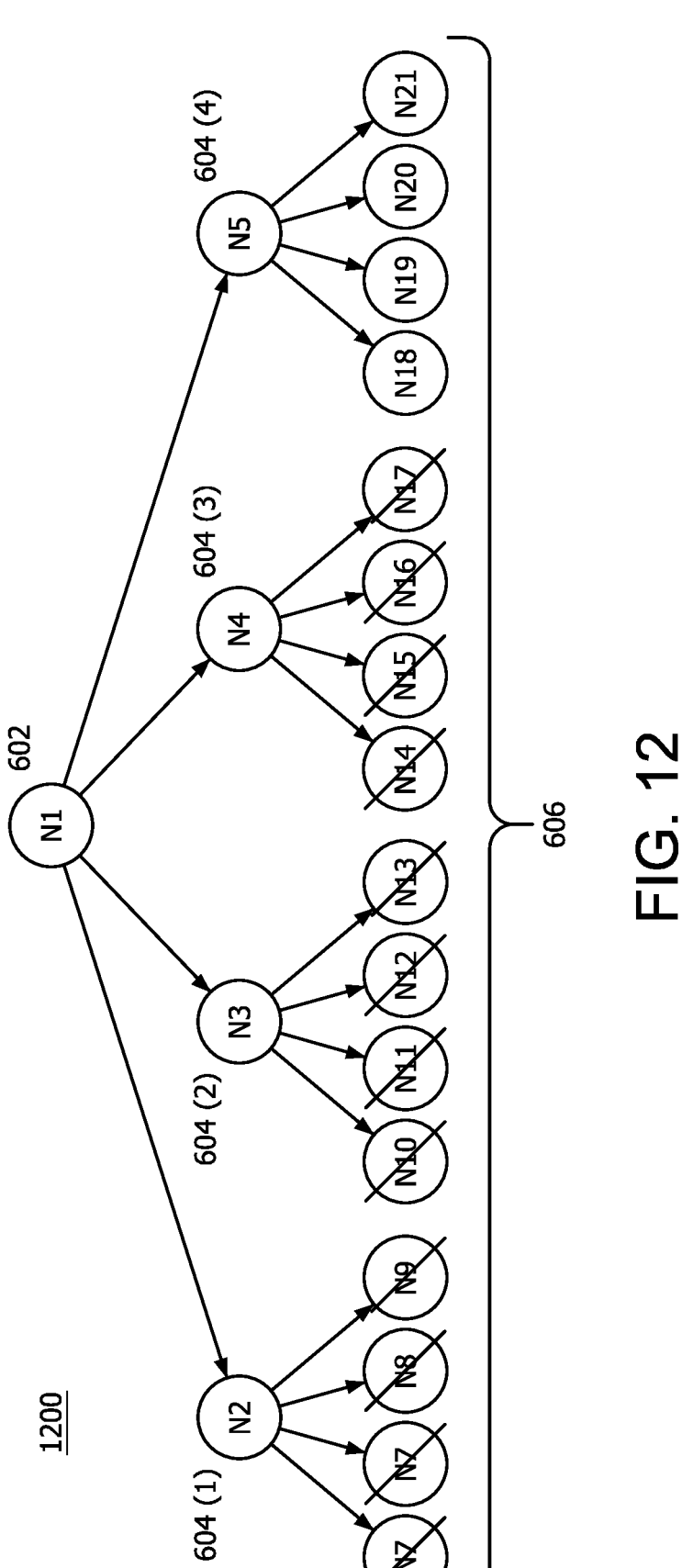
FIG. 12 is an illustration of a bounding volume hierarchy of the displaced micro-mesh shown in FIG. 11.

FIG. 12, is an illustration of a BVH 1200 of the displaced micro-mesh 802 shown in FIG. 11. On the condition that the first level prism 1102 is hit by the ray (corresponding to N1 of the BVH 1200), then one or more of the sub-prisms (e.g., 1102(1)-1102(4)) of a second level are generated and the ray is tested against the one or more sub-prisms corresponding to N2-N4 of the BVH 1200. On the condition that sub-prisms 1102(1)-1102(3) are not hit by the ray, then those sub-prisms are not sub-divided any further and nodes N6-N17 are not generated and thus no data is stored for these nodes (as indicated in FIG. 12). That is, in this example, nodes N6-N17 would not be part of the hierarchy (i.e., not generated) but are shown in FIG. 12 with strikethroughs for explanation purposes merely to show their potential generation if nodes N2-N4 were hit by the ray). If sub-prism 1102(4) is hit by the ray, the sub-prism is further sub-divided into another set of smaller sub-prisms (not shown), corresponding to nodes N18-N21 representing a third level of the bounding prism hierarchy and nodes N18-N21 are generated (and data is temporarily stored for these nodes) to determine if the smaller sub-prisms, corresponding to nodes N18-N21, are hit by the ray.

In a first example, the BVH is traversed by generating (and testing against) sub-prisms of a level of the hierarchy, one at a time, after recursively generating and testing against a previous sub-prism of the level and each of the child sub-prisms (i.e., of next levels) of the previous sub-prism of the level. For example, after testing against a first level prism that bounds the whole displaced micro-mesh (e.g., a micro-triangle of the displaced micro-mesh), a first second level sub-prism is generated. If the ray does not intersect the first second level sub-prism, third level sub-prisms are generated and tested against, again one at a time, and after recursion (generating and testing against the third level sub-prisms, a next second level sub-prism is generated and tested.

In a second example, the BVH is traversed by determining which second level sub-prism is first intersected by a ray and then determining which of the other second sub-prisms is intersected by the ray based on where the ray leaves a first second level sub-prism. For example, after it is determined where the ray intersects the bounding surfaces (e.g., top surface, bottom surface, 3 side surfaces) of the first level prism, a second level prism is determined to be first intersected by the ray. Then, it is determined which third level sub-prism, of the second level sub-prism, is first intersected by the ray along the direction of the ray and determining where the ray intersects a next second level sub-prism based on where the ray leaves the second level sub-prism. Accordingly, instead of testing all sub-prisms at a recursion level, only the intersected sub-prisms at a level are generated and tested recursively.

As shown at block 514, the method 500 includes rendering the frame based on the ray tracing (e.g., ray intersection testing) performed at block 510. For example, the objects in the frame are rendered for display on a display device (e.g., display device 118). At decision block 516, a determination is made as to whether or not a next frame is to be ray traced. On the condition that a next frame is to be ray traced ("Yes" decision), the method proceeds back to block 511 and the next frame is queued. On the condition that no next frame is to be ray traced ("No" decision), the method ends.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering a scene using ray tracing, the method comprising:

prior to ray tracing a current frame of the scene:

generating, for the scene, a low resolution mesh from a high resolution mesh representing objects in the scene, the low resolution mesh comprising a plurality of micro-meshes each defining a geometric shape, and for each of the plurality of micro-meshes of the low resolution mesh generating a displaced micro-mesh by computing, for vertices of a respective micro-mesh, signed displacement values expressed in scene-length units and measured along interpolated normals derived from a triangular curved surface patch constructed from vertex positions and vertex normals of the corresponding geometric shape; and for the current frame of the scene:

ray tracing at least one displaced micro-mesh using a bounding prism hierarchy comprising a prism bounding the displaced micro-mesh and a plurality of sub-prisms each bounding a corresponding portion of the displaced micro-mesh, and rendering the frame.

2. The method of claim 1, further comprising sub-dividing the micro-meshes into sub-divided geometric shapes and sub-dividing the sub-divided geometric shapes into micro-geometric shapes.

3. The method of claim 2, further comprising, prior to ray tracing the current frame of the scene:

interpolating normals of the sub-divided geometric shapes and the micro-geometric shapes using the triangular curved surface patch;

computing the signed displacement values for vertices of the respective micro-mesh, measured along the interpolated normals and computed from samples of the high resolution mesh; and displacing the vertices by the signed displacement values.

4. The method of claim 3, wherein the displaced micro-mesh is generated based on:

the interpolated normals of the sub-divided geometric shapes and the micro-geometric shapes, and the signed displacement values of displaced vertices of the respective micro-mesh along the interpolated normals.

5. The method of claim 3, wherein each of the plurality of sub-prisms is generated based on:

minima and maxima of the signed displacement values of a corresponding sub-divided geometric shape; and interpolated normals at vertices of the corresponding sub-divided geometric shape.

6. The method of claim 2, wherein the geometric shape, the sub-divided geometric shapes and the micro-geometric shapes are triangles or bi-linear quadrangles.

7. The method of claim 1, wherein:

the prism and each sub-prism are computed from minima and maxima of the signed displacement values along the interpolated normals, and at least one face of the prism or of a sub-prism is a bilinear surface, and the prism is generated based on:

minima and maxima of the signed displacement values measured along the interpolated normals; and the interpolated normals at vertices of the displaced micro-mesh.

8. The method of claim 7, further comprising:

prior to ray tracing the current frame of the scene, deriving the interpolated normals using the triangular curved surface patch, wherein the prism is also generated based on minima and maxima of signed displacement values determined from the triangular curved surface patch.

9. The method of claim 1, wherein each portion of the displaced micro-mesh corresponds to one of the sub-divided geometric shapes of the displaced micro-mesh.

10. The method of claim 1, further comprising ray tracing at least one other displaced micro-mesh using the prism bounding the displaced micro-mesh prior to generating any of the plurality of sub-prisms for that displaced micro-mesh.

11. The method of claim 10, further comprising:

ray tracing each displaced micro-mesh using a bounding volume hierarchy;

on a condition that the prism is hit by the ray, generating the bounding prism hierarchy by sub-dividing the prism into the plurality of sub-prisms, and ray tracing the at least one displaced micro-mesh using the bounding prism hierarchy by continuing traversal of the bounding volume hierarchy of the at least one displaced micro-mesh and testing the ray against at least one of the plurality of sub-prisms; and on a condition that the prism is not hit by the ray, continuing to ray trace the at least one other displaced micro-mesh using the prism bounding the displaced micro-mesh without generating any of the plurality of sub-prisms for the at least one displaced micro-mesh.

12. The method of claim 10, further comprising ray tracing each displaced micro-mesh using a bounding volume hierarchy by:

generating, one at a time, sub-prisms of a level of the bounding prism hierarchy and testing for ray-intersection of each sub-prism after recursively generating and testing for ray-intersection of a previous sub-prism of the level and each child sub-prism of the previous sub-prism.

13. The method of claim 10, further comprising ray tracing each displaced micro-mesh using a bounding volume hierarchy by:

determining which second level sub-prism is first inter-sected by a ray; and determining which other second-level sub-prisms are intersected by the ray based on where the ray leaves a first second-level sub-prism.

14. The method of claim 1, further comprising:

responsive to determining that the prism is intersected by a ray, generating sub-prisms for portions intersected by the ray during traversal and testing the ray against the sub-prisms while traversal continues.

15. A computing device for rendering a scene using ray tracing, the computing device comprising:

memory; and an accelerated processor in communication with the memory, configured to:

prior to ray tracing a current frame of the scene:

generate, for the scene, a low resolution mesh from a high resolution mesh representing objects in the scene, the low resolution mesh comprising a plural-ity of micro-meshes each defining a geometric shape; and for each of the plurality of micro-meshes of the low resolution mesh generate a displaced micro-mesh by computing, for vertices of a respective micro-mesh, signed displacement values expressed in scene-length units and measured along interpolated nor-mals derived from a triangular curved surface patch constructed from vertex positions and vertex nor-mals of the corresponding geometric shape; and for the current frame of the scene:

ray trace at least one of the displaced micro-meshes, each represented by data in the memory, using a bounding prism hierarchy comprising a prism bounding the displaced micro-mesh and a plurality of sub-prisms each bounding a portion of the dis-placed micro-mesh; and render the frame.

16. The computing device of claim 15, wherein the accelerated processor is configured to:

sub-divide the micro-meshes into sub-divided geometric shapes and to sub-divide the sub-divided geometric shapes into micro-geometric shapes.

17. The computing device of claim 16, wherein the accelerated processor is configured to, prior to ray tracing the current frame of the scene:

interpolate normals of the sub-divided geometric shapes and the micro-geometric shapes;

using the triangular curved surface patch;

compute signed displacement values expressed in scene-length units and measured along the interpolated nor-mals from samples of the high resolution mesh; and generate the displaced micro-mesh based on:

the interpolated normals of the sub-divided geometric shapes and the micro-geometric shapes and signed displacement values of displaced vertices of the micro-mesh along the interpolated normals.

18. The computing device of claim 17, wherein:

the prism and each sub-prism are computed from minima and maxima of the signed displacement values along the interpolated normals, and at least one face of the prism or of a sub-prism is a bilinear surface, and the accelerated processor is configured to generate the prism based on:

minima and maxima of the signed displacement values measured along the interpolated normals; and interpolated normals at the vertices of the displaced micro-mesh, such that at least one face of the prism is bilinear.

19. The computing device of claim 18, wherein the accelerated processor is configured to:

prior to ray tracing the current frame of the scene, derive the interpolated normals using the triangular curved surface patch, wherein the prism is also generated based on minima and maxima of signed displacement values determined from the triangular curved surface patch.

20. An accelerated processor for rendering a scene using ray tracing, the accelerated processor comprising:

memory; and fixed function hardware circuitry, in communication with the memory, configured to:

prior to ray tracing a current frame of the scene:

generate, for the scene, a low resolution mesh from a high resolution mesh representing objects in the scene, the low resolution mesh comprising a plural-ity of micro-meshes each defining a geometric shape, for each of the plurality of micro-meshes of the low resolution mesh, generate a displaced micro-mesh by computing, for vertices of a respective micro-mesh, signed displacement values expressed in scene-length units and measured along interpolated nor-mals derived from a triangular curved surface patch constructed from vertex positions and vertex nor-mals of the corresponding geometric shape; and for the current frame of the scene:

ray trace at least one of the displaced micro-meshes using a bounding prism hierarchy comprising a prism bounding the displaced micro-mesh and a plurality of sub-prisms each bounding a portion of the displaced micro-mesh; and render the frame.

\* \* \* \* \*